United States Patent
Myrstad et al.

(10) Patent No.: US 8,980,201 B2
(45) Date of Patent: Mar. 17, 2015

(54) APPARATUS AND PROCESS FOR THREE-PHASE REACTION

(75) Inventors: Trond Myrstad, Trondheim (NO); Dag Schanke, Trondheim (NO); Pål Søraker, Trondheim (NO); Matthias Wagner, Nidderau (DE); Manfred Ruppel, Dietzenbach (DE)

(73) Assignee: GTL.FI AG, Zurich (CH)

( * ) Notice: Subject to any disclaimer, the term of this patent is extended or adjusted under 35 U.S.C. 154(b) by 263 days.

(21) Appl. No.: 13/378,565

(22) PCT Filed: Jun. 22, 2010

(86) PCT No.: PCT/GB2010/001223
§ 371 (c)(1),
(2), (4) Date: Mar. 1, 2012

(87) PCT Pub. No.: WO2010/149961
PCT Pub. Date: Dec. 29, 2010

(65) Prior Publication Data

US 2012/0157555 A1 Jun. 21, 2012

(30) Foreign Application Priority Data

Jun. 26, 2009 (GB) .................................. 0911147.7

(51) Int. Cl.
*B01J 8/00* (2006.01)
*B01J 8/22* (2006.01)
(Continued)

(52) U.S. Cl.
CPC . *B01J 8/22* (2013.01); *B01D 45/08* (2013.01); *B01J 8/0055* (2013.01);
(Continued)

(58) Field of Classification Search
CPC .... B01J 8/00; B01J 19/00; B01J 2219/00006; B01J 2523/00; B01J 2231/60; B01J 2231/64; B01J 2231/641; B01J 2231/648; A01N 59/00; A01N 37/16; C07C 15/08; C07C 31/08; C07C 201/08; C07C 11/04; C07C 51/265; C07C 1/00; C01B 2203/0233; C10G 2/32; C10G 2/332; C10G 2/342; C10G 2300/00; C10G 2300/10; C10G 2300/1022
USPC ........... 422/129, 187, 600, 608, 616; 518/700
See application file for complete search history.

(56) References Cited

U.S. PATENT DOCUMENTS

| | | | |
|---|---|---|---|
| 4,166,840 | A | 9/1979 | Chapman |
| 4,610,851 | A | 9/1986 | Colvert et al. |

(Continued)

FOREIGN PATENT DOCUMENTS

| | | |
|---|---|---|
| CA | 2624815 | 4/2007 |
| EP | 0 592 176 A1 | 4/1994 |

(Continued)

OTHER PUBLICATIONS

Twigg, Martyn V., editor, "Catalyst Handbook," 2nd ed., Wolf Publishing Ltd. (1989), p. 195.

(Continued)

*Primary Examiner* — Natasha Young
(74) *Attorney, Agent, or Firm* — Patterson Thuente Pedersen, P.A.

(57) ABSTRACT

A system and process for removing catalyst fines from a gas stream overhead the slurry in a Fischer-Tropsch slurry bubble column reactor. The gas phase at the top of the slurry bubble column reactor containing small amounts of entrained liquid and catalyst particles. The unreacted gases are passed through a demister, which removes larger droplets and catalyst particles. Smaller droplets and catalyst fines are conveyed to a secondary gas cleaner, such as a cyclone, whereby substantially all remaining particles are removed from the gas phase. A particle-containing liquid produced in the secondary gas cleaner can be further subjected to a filtrate cleaning unit to filter out fine catalyst particles and produce a substantially particle-free liquid product stream and a slurry stream of liquid product containing catalyst particles.

26 Claims, 1 Drawing Sheet

(51) Int. Cl.
*B01D 45/08* (2006.01)
*C10G 2/00* (2006.01)
*C10G 45/58* (2006.01)
*C10G 47/00* (2006.01)
*B01J 8/08* (2006.01)
*B01J 19/00* (2006.01)
*B01J 19/24* (2006.01)
*C07C 1/00* (2006.01)

(52) U.S. Cl.
CPC ............... *B01J 8/006* (2013.01); *B01J 8/0065* (2013.01); *C10G 2/342* (2013.01); *C10G 45/58* (2013.01); *C10G 47/00* (2013.01)
USPC .......... 422/616; 422/129; 422/187; 422/600; 422/608; 518/700

(56) References Cited

U.S. PATENT DOCUMENTS

| | | | |
|---|---|---|---|
| 4,624,968 | A | 11/1986 | Kim et al. |
| 5,384,336 | A * | 1/1995 | Koros ............................ 518/700 |
| 5,527,473 | A | 6/1996 | Ackerman |
| 5,827,903 | A | 10/1998 | White et al. |
| 6,160,026 | A | 12/2000 | Dai et al. |
| 6,278,034 | B1 | 8/2001 | Espinoza et al. |
| 6,835,756 | B2 * | 12/2004 | Font Freide et al. .......... 518/712 |
| 2003/0021738 | A1 | 1/2003 | Brunard et al. |
| 2003/0050348 | A1 | 3/2003 | Kennedy |
| 2003/0195264 | A1 | 10/2003 | Newton et al. |
| 2004/0147621 | A1 | 7/2004 | Font-Freide et al. |
| 2005/0000861 | A1 | 1/2005 | Clerici et al. |
| 2005/0047992 | A1 | 3/2005 | Dietrich et al. |
| 2005/0113465 | A1 | 5/2005 | O'Rear et al. |
| 2006/0135631 | A1 | 6/2006 | Kopponen et al. |
| 2007/0197667 | A1 | 8/2007 | Vogel |
| 2009/0071337 | A1 * | 3/2009 | Nieuwoudt ..................... 95/272 |
| 2010/0137458 | A1 | 6/2010 | Erling |
| 2011/0313062 | A1 | 12/2011 | Ruppel et al. |
| 2011/0313063 | A1 | 12/2011 | Soraker et al. |

FOREIGN PATENT DOCUMENTS

| | | |
|---|---|---|
| EP | 0609079 | 8/1994 |
| GB | 1250222 | 10/1971 |
| GB | 1265770 | 3/1972 |
| GB | 2 408 744 A | 6/2005 |
| WO | WO 00/63141 | 10/2000 |
| WO | WO 03/010117 A2 | 2/2003 |
| WO | WO 2004/026994 A1 | 4/2004 |
| WO | WO2004026994 | 4/2004 |
| WO | WO 2005/005038 | 1/2005 |
| WO | WO 2005/094979 | 10/2005 |
| WO | WO 2006/097905 | 9/2006 |
| WO | WO 2007/009952 A1 | 1/2007 |
| WO | WO 2007/041726 | 4/2007 |
| WO | WO 2007/065904 A1 | 6/2007 |
| WO | WO 2007/086612 | 8/2007 |
| WO | WO2008062208 | 5/2008 |
| WO | WO 2008/146239 | 12/2008 |
| WO | WO 2009/043201 A1 | 4/2009 |
| WO | WO 2010/072992 A2 | 7/2010 |

OTHER PUBLICATIONS

International Search Report for International Application No. PCT/GB2007/004484 dated Mar. 25, 2009 and GB Search Report for GB0623394.4 dated Mar. 25, 2007.
International Search Report for International Application No. PCT/GB2009/002698 dated Mar. 26, 2010 and GB Search Report for GB0821094.0 dated Feb. 11, 2009.
International Search Report for International Application No. PCT/GB2009/002836 dated Feb. 28, 2011 and GB Search Report for GB Application No. GB0823361.1 dated Feb. 26, 2009.
Application and File History for U.S. Appl. No. 12/515,933, filed Feb. 1, 2010, inventor Rytter.
Application and File History for U.S. Appl. No. 13/130,041, filed Sep. 7, 2011, inventors Ruppel et al.
Application and File History for U.S. Appl. No. 13/140,384, filed Sep. 6, 2011, inventors Soraker et al.
Steyberg and Dry (Fischer-Tropsch Technology) in studies in Surface Science and Catalysis v. 152 (2004) 700 pages.
International Search Report for International Application No. PCT/GB2011/000596 dated Jun. 30, 2011.
Application and File History for U.S. Appl. No. 13/641,847, filed Oct. 17, 2012.
Koch-Glitsch LP (Koch-Otto York separations technology): "Mist Elimination," Jan. 1, 2007, XP002627243, pp. 3,4,9,10, retried Mar. 8, 2011, www.koch-glitsch.com/Document%20Library/ME_ProductCatalog.pdf.

* cited by examiner

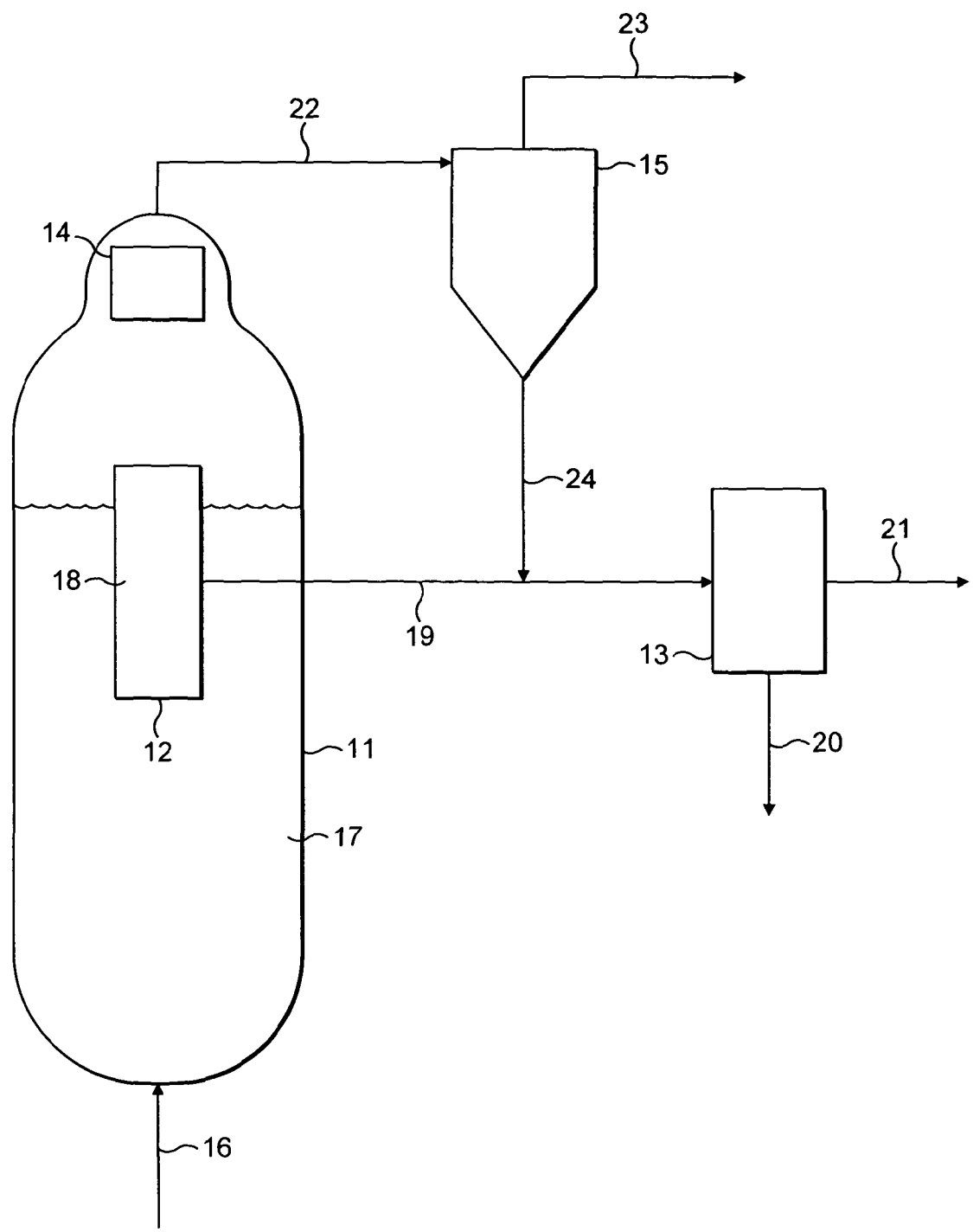

APPARATUS AND PROCESS FOR THREE-PHASE REACTION

RELATED APPLICATIONS

The present application is a National Phase entry of PCT Application No. PCT/GB2010/001223, now WO 2010/149961, filed Jun. 22, 2010, which claims priority from Great Britain Application No. 0911147.7, filed Jun. 26, 2009, the disclosures of which are hereby incorporated by reference in their entireties.

TECHNICAL FIELD

The present invention relates to an apparatus and process for conducting a three-phase reaction and is particularly concerned with the recovery of fine catalyst particles from an overhead gas stream. While the invention is applicable to any three-phase reaction, it is particularly applicable to a Fischer-Tropsch synthesis reaction.

BACKGROUND OF THE INVENTION

Without purification both the gaseous and liquid products from a slurry bubble column Fischer-Tropsch reactor will contain catalyst particles.

The gas phase at the top of a slurry bubble column reactor will contain small amounts of entrained liquid and catalyst particles. The largest catalyst particles will to some extent fall down to the slurry phase again by gravity, but the remaining catalyst particles will leave the reactor with the gaseous product, unless they are separated from the gas phase. As a result of the particle size separation, the catalyst particles which remain in the gas phase will be smaller than the average particle size in the slurry phase. Entrained catalyst particles which not are separated from the gas will cause unwanted loss of catalyst, as well as problems downstream of the reactor such as agglomeration of catalyst particles at specific locations, with the possible formation of hot spots, fouling of heat exchangers due to deposition of liquid and catalyst particles, and contamination of the condensed liquid product with catalyst particles.

The slurry phase in a slurry bubble column reactor contains catalyst particles and produced liquid. The produced liquid is separated from the slurry for instance in cylindrical porous metal filter elements. The liquid product after such a filtration, denoted as primary liquid filtrate, will contain at least minor amounts of catalyst particles. These catalyst particles will typically have a particle size smaller than or equal to the pore openings in the filters inside the slurry bubble column reactor. If these particles not are separated from the liquid product, they will cause unwanted loss of catalyst, as well as problems downstream of the reactor, such as agglomeration of catalyst particles at specific locations, with possible fouling of heat exchangers due to deposition of liquid product with catalyst particles. The liquid product from an F-T synthesis is usually further refined, in hydrocracking/hydroisomerisation units, and the catalyst in such units will tolerate only very low levels of F-T catalyst particle contamination. In some such applications, the particle concentration in the liquid product must be as low as 10 ppmw.

EP 592176 A discloses a slurry bubble column reactor including a number of filter cartridges in the upper part of the reactor. Liquid hydrocarbon product is removed from the region above the filter cartridges.

BRIEF SUMMARY OF THE INVENTION

In some aspects of the present invention, there is provided an apparatus for conducting a three-phase reaction, in which gaseous reactants are reacted in the presence of a finely divided solid catalyst in suspension in a liquid comprising, at least in part, the reaction products of the gaseous reactants, thereby forming a slurry, the apparatus comprising a reactor vessel, a filtration system, and a gas demister, wherein the reactor vessel includes a reactant inlet and is arranged, in use, to accommodate the slurry with a gas space above the slurry. The apparatus further comprises a secondary gas cleaner, the filtration system includes a primary filter arranged to be in contact with the slurry during normal operation and use, the primary filter having an outlet for primary filtrate that has been subjected to primary filtration, the gas demister arranged to remove entrained material from gas in the gas space above the slurry and to produce a demister gas stream, and the secondary gas cleaner arranged to receive the demisted gas stream and to remove further relatively finer entrained material from the demisted gas stream.

In some aspects, the gas demister is located within the gas space at the top of the reactor vessel. In some aspects, the gas demister is a vane pack mist eliminator. In some aspects, the vane pack mist eliminator has a series of corrugated plates, arranged generally vertically whereby gas flows vertically upwardly through the vane pack mist eliminator.

In some aspects, the demister has a cross-sectional area that is smaller than a cross-sectional area of the reactor above the slurry level, whereby the velocity of the gas is increased as it passes through the demister during normal operation of use.

In some aspects, the apparatus is configured such that the entrained material removed by the gas demister is returned to the slurry during normal operation of use.

In some aspects, the apparatus contains a secondary gas cleaner that is a cyclone.

In some aspects, the apparatus is configured such that the secondary gas cleaner has a substantially particle-free gaseous product outlet and a particle-containing liquid product outlet.

In some aspects, the apparatus is configured such that the primary filter is located within the reactor. In some aspects, the primary filter is arranged during normal operation of use to be at least partially immersed in the slurry.

In some aspects, the apparatus contains a filtrate cleaning unit arranged to receive the primary filtrate from the primary filter. In some aspects, the filtrate cleaning unit is a secondary filter unit, with the primary filter unit comprising a relatively coarse filter and the secondary filter unit comprising a relatively fine filter. In some aspects, the filtrate cleaning unit is located outside the reactor vessel In some aspects, the apparatus is configured such that the filtrate cleaning unit has a product outlet for substantially particle-free liquid product and a slurry outlet for liquid product including catalyst particles.

In some aspects of the present invention, there is provided a process for conducting a three-phase reaction in which gaseous reactants are reacted in the presence of a finely divided solid catalyst in suspension in a liquid comprising, at least in part, the reaction product of the gaseous reactants thereby forming a slurry, the process comprising the steps of: introducing the gaseous reactants into the slurry in a reactor, subjecting the slurry to a primary filtration in a primary filter to produce a primary filtrate stream, and subjecting gases above the slurry to a demisting step in which entrained material is removed from the gas to produce a demisted gas stream. In some aspects, the process further comprises the step of subjecting the demisted gas stream to a secondary cleaning step in which further relatively finer entrained material is removed from the demisted gas stream.

In some aspects, the entrained material removed by the gas demister is arranged to be returned to the slurry during normal operational use.

In some aspects, the secondary cleaning step produces a substantially particle-free gaseous product stream and a particle containing liquid product stream.

In some aspects, the process further comprises subjecting the primary filtrate stream to a second filtration in a filtrate cleaning unit to produce a substantially particle-free liquid product stream and slurry stream of liquid product including catalyst particles.

In some aspects, the process further comprises a fines removal step in which fine catalyst particles filtered out in the filtrate cleaning step are removed from the filtrate cleaning unit.

In some aspects, the process further comprises conveying the particle-containing liquid product stream from the second cleaning step to the filtrate cleaning unit.

In some aspects, the reaction is a Fischer-Tropsch synthesis reaction, carried out in a slurry bubble column reactor, and in which $H_2$ and CO are supplied to a slurry in the reactor, the slurry comprising the catalyst in suspension in a liquid including the reaction products of the $H_2$ and CO, and the catalyst being maintained in suspension in the slurry at least partly by the motion of the gas supplied to the slurry.

In some aspects, the reaction temperature is in the range of 190-250° C. and/or the reaction pressure is in the range of 10-60 bar.

In some aspects, the $H_2$/CO ratio of the gases supplied to the Fischer-Tropsch synthesis reactor is in the range 1.1 to 2.2.

In some aspects, the superficial gas velocity in the reactor is in the range of 5 to 60 cm/s.

In some aspects, the Fischer-Tropsch synthesis reaction is subsequently subjected to post-processing.

In some aspects, the post-processing is chosen from de-waxing, hydro-isomerisation, hydro-cracking and combinations thereof.

DESCRIPTION OF THE DRAWING

The invention may be more completely understood in consideration of the following detailed description of various embodiments of the invention in connection with the accompanying drawing, in which:

FIG. 1 is a schematic drawing of a section of a Fischer-Tropsch synthesis operation according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

It is an object of the present invention to alleviate the problems associated with catalyst entrainment in the gases leaving a slurry bubble column reactor.

According to one aspect of the invention, there is provided an apparatus for conducting a three-phase reaction, in which gaseous reactants are reacted in the presence of a finely divided solid catalyst in suspension in a liquid comprising, at least in part, the reaction products of the gaseous reactants, thereby forming a slurry, the apparatus comprising a reactor vessel, a filtration system, a gas demister, and a secondary gas cleaner, and in which: the reactor vessel includes a reactant inlet and is arranged, in use, to accommodate the slurry with a gas space above; the filtration system includes a primary filter which is arranged to be in contact with the slurry in use, the primary filter having an outlet for primary filtrate which has been subjected to a primary filtration; the gas demister is arranged to remove entrained material from gas in the gas space above the slurry and to produce a demister gas stream; and the secondary gas cleaner is arranged to receive the demisted gas stream and to remove further relatively finer entrained material from the demisted gas stream.

According to another aspect of the invention, there is provided a process for conducting a three-phase reaction in which gaseous reactants are reacted in the presence of a finely divided solid catalyst in suspension in a liquid comprising, at least in part, the reaction product of the gaseous reactants thereby forming a slurry, the process comprising the steps of: introducing the gaseous reactants into the slurry in a reactor; subjecting the slurry to a primary filtration in a primary filter to produce a primary filtrate stream; and subjecting gases above the slurry to a demisting step in which entrained material is removed from the gas to produce a demisted gas stream; subjecting the demisted gas stream to a secondary cleaning step in which further relatively finer entrained material is removed from the demisted gas stream.

Preferably, the gas demister is located within the gas space at the top of the reactor vessel. The demister is preferably a vane pack mist eliminator. A vane pack mist eliminator consists of several corrugated plates. The gas flows preferably vertically through the vane pack mist eliminator. Liquid droplets and catalyst particles are removed as a result of a change in direction of the gas flow. Due to this change in direction, liquid droplets and catalyst particles are subjected to acceleration forces, moving them towards a surface onto which they coalesce, thus establishing separation. The changes in the direction of the gas flow are caused by the bends in the corrugated plates.

In a vane pack mist eliminator, the optimal gas velocity is in the order of 1 m/s. In a slurry bubble column reactor, the gas velocity us much lower, typically in the order 0.1-0.35 m/s. This implies that the demister cross sectional area will be only in the range 10-35% of the reactor cross sectional area, i.e. the effective reactor diameter must be reduced above the slurry level. Build-up of catalyst particles inside the mist eliminator is not expected to be a problem, but for operational reasons, it should be made possible to back-flush to demister with liquid, preferably with heavy Fischer-Tropsch condensate, in the case of a Fischer-Tropsch synthesis.

A typical efficiency for separation of Fischer-Tropsch catalyst particles in a vane pack demister is given in Table 1.

TABLE 1

| Typical separation efficiency for a vane pack demister. ||
| --- | --- |
| Particle diameter (μm) | Separation efficiency (%) |
| 10 | 16.2 |
| 20 | 53.6 |
| 25 | 71.1 |
| 30 | 83.3 |
| 35 | 90.7 |
| 40 | 94.9 |
| 45 | 97.2 |
| 50 | 98.5 |

Preferably, the entrained material removed by the gas demister is arranged to be returned to the slurry, in use.

Preferably, the secondary gas cleaner is a cyclone and preferably has a substantially particle-free gaseous product outlet and a particle-containing liquid product outlet.

As can be seen from Table 1 above, the separation efficiency of a demister for the smallest catalyst particles, i.e. catalyst particles smaller than 25-30 µm is rather low. Further reduction of the entrained catalyst particles in the gas phase can however be achieved by using a cyclone. The use of cyclones is a well-proven technology for separation of particles from gas streams, and can be installed both inside and outside the slurry reactor. For operational reasons, it is preferred to install the cyclone outside the slurry reactor.

The separation efficiency of a cyclone is given by the equation:

$$D_{pc} = 0.27 \sqrt{\frac{\mu D_c}{V_c(\rho_p - \rho)}}$$

Where $D_{pc}$="cut size" for particles, defined as particles with 50% separation efficiency
$\mu$=gas viscosity
$D_c$=cyclone diameter
$\rho$=gas density
$\rho_p$=particle density
$V_c$=gas velocity at cyclone inlet (with a cross sectional area of $(D_c/2).(D_c/4)$)

By adjusting the cyclone diameter, and thereby the cyclone inlet gas velocity, a cyclone can be designed for almost any "cut size".

A possible problem by using cyclones is increased attrition of the catalyst particles. Due to this possible problem, it is preferred to remove as much as possible of the catalyst particles from the gas stream in the mist eliminator prior to the cyclone. Catalyst particles removed from the gas stream in the mist eliminator will be returned to the reactor, while catalyst particles removed from the gas stream in the cyclone(s) in most cases will not be returned to the reactor.

The gaseous product after the cyclone is sent to further treatment, such as fractionation, while the liquid and catalyst particles are collected, or more preferably, routed to the liquid product line after the primary liquid filtration.

Preferably, the primary filter is located within the reactor. It is preferably arranged, in use, to be at least partially immersed in the slurry. Preferably, the primary filter is a porous metal enclosure, such as a cylinder, with pores having a diameter smaller than the average diameter of the catalyst particles.

Preferably, the system includes a filtrate cleaning unit, arranged to receive the primary filtrate from the primary filter. Preferably, the filtrate unit is a secondary filter unit, the primary filter unit comprising a relatively coarse filter and the secondary filter unit comprising a relatively fine filter. Preferably, the filtrate cleaning unit is located outside the reactor vessel. Preferably, the filtrate cleaning unit has a product outlet for substantially particle-free liquid product and a slurry outlet for liquid product including catalyst particles.

Several possible technical solutions for removing catalyst particles from the liquid phase (secondary liquid filtration) are possible, such as sedimentation, dead end filtration and cross-flow filtration. The preferred solution is to install a cross-flow filter on the liquid product line after the primary liquid filtration.

A preferred cross-flow filter employs an inertial filter system that allows the filtrate to flow radially through a porous media at a relatively low face velocity as compared to that of the mainstream axial flow. The high axial velocity prevents particles from entering the porous media by the ballistic effect of particle inertia.

The liquid product after the filtrate cleaning operation may be sent to further treatment, such as hydrocracking/hydroisomerisation units, while catalyst particles in the form of a slurry with high concentration of catalyst particles can be collected. If the catalyst particles collected in the filtrate cleaning unit are not considered to cause any operational problems in the Fischer-Tropsch slurry bubble column reactor, the catalyst particles can be routed back to the reactor again.

Preferably, therefore, the process additionally includes the step of subjecting the primary filtrate stream to a second filtration in a secondary filter to produce a substantially particle-free liquid product stream and a slurry stream of liquid product including catalyst particles. Preferably also, therefore, the process includes a fines removal step in which fine catalyst particles filtered out in the filtrate cleaning step are removed from the filtrate cleaning unit.

The reaction may be a Fischer-Tropsch synthesis reaction, carried out in a slurry bubble column reactor, and in which $H_2$ and CO are supplied to a slurry in the reactor, the slurry comprising the catalyst in suspension in a liquid including the reaction products of the $H_2$ and CO, the catalyst being maintained in suspension in the slurry at least partly by the motion of the gas supplied to the slurry. The reaction temperature may be in the range of 190-250° C. and/or the reaction pressure is in the range 10-60 bar. The $H_2$/CO ratio may be in the range 1.1 to 2.2, and the superficial gas velocity in the reactor may be in the range 5 to 60 cm/s.

The F-T product may be subjected to post-processing such as de-waxing hydro-isomerisation, hydro-cracking and combinations of these.

The invention extends to the F-T product itself when made using the apparatus and/or process of the invention, and also to the products following post-processing.

The invention may be carried into practice in various ways and one embodiment will now be described by way of example with reference to the accompanying drawings, in which the single figure is a schematic diagram of part of a Fischer-Tropsch synthesis process, incorporating the present invention.

The section of a Fischer-Tropsch synthesis operation shown in FIG. 1 includes a reactor vessel 11, a primary filter 12, located within the reactor 11, a filtrate cleaning unit 13 outside the reactor 11, a primary gas cleaner in the form of a demister 14, and a gas cleaner in the form of a secondary cyclone 15. The reactor 11 is equipped with conventional internal features (not shown) such as heat exchange piping and baffles. The internal filter 12 is relatively coarse, having a pore size in the range 25 to 105 micrometers. The filtrate cleaning unit 13 is arranged to remove relatively finer particles than the internal filter 12. In case the filtrate cleaning unit 13 in this case comprises a cross-flow filter with pore openings <500 nm.

The demister 14 is located at the top of the reactor 11 and has a smaller cross-sectional area than that of the reactor 11. It is in the form of a vane pack mist eliminator and consists of several corrugated plates arranged so that gas flows vertically through the device. It is suitable for the removal of the larger entrained particles.

The cyclone 15 is a conventional cyclone for removing entrained material from a gas stream. The cyclone 15 receives a gas stream from the demister 14 and is arranged to remove the remaining particles of catalyst and liquid from the gas.

The system operates in the following way. $H_2$ and CO gas is introduced into the reactor 11 via a reactant inlet 16. The gases enter a slurry 17 in the reactor 11 comprising catalyst particles suspended in liquid wax produced by the F-T synthesis reaction. The catalyst particles are at least partially maintained in suspension by the upwardly moving gas bubbles.

Wax product enters a primary filtrate zone 18 within the internal filter 12. This primary filtrate includes catalyst fines. The primary filtrate is conveyed, optionally via a degasser unit (not shown), to the filtrate cleaning unit 13, via a primary filtrate line 19.

Catalyst fines are extracted from the primary filtrate in the filtrate cleaning unit 13 and removed. Filtered wax product from the filtrate cleaning unit 13 is removed via a wax product line 21.

Un-reacted gases and lighter fractions pass through the demister 14, while larger entrained particles of catalyst and liquid fall back into the slurry 17. Liquid droplets and catalyst particles which remain entrained in the gas are removed in the demister 14 as a result of the changes in direction of the gas flow brought about by the corrugated nature of the plates in the demister 14. The droplets and catalyst particles which are removed fall back into the slurry 17. An optional back flushing line (not shown) can be directed to the top of the demister 14 by means of which the demister can be back flushed with heavy F-T condensate.

Gas leaves the demister 14 and is conveyed to the cyclone 15 via a primary cleaned gas line 22. This gas stream contains only very fine entrained particles and those are removed in the cyclone 15. A substantially particle free gas stream 23 leaves the cyclone 15. The gas stream 23 can then be subjected to fractionation to separate hydrocarbons from unconverted reactant gases, and the unconverted reactant gases can be recycled to the reactor 11. In addition, a liquid phase including catalyst fines separated by the cyclone 15 is removed and conveyed via a cyclone slurry line 24.

The cyclone slurry line 24 is preferably directed to the primary filtrate line 19 and so the fines removed by the cyclone 15 are conveyed to the filtrate cleaning unit 13. From here they are removed via the fines outlet 20 along with the catalyst fines from the filtrate product. Optionally, the cyclone slurry line 24 can be routed back to the reactor 11 or to a separate storage tank (not shown).

The invention claimed is:

1. An apparatus for conducting a three-phase reaction, in which gaseous reactants are reacted in the presence of a finely divided solid catalyst in suspension in a liquid comprising, at least in part, one or more reaction products of the gaseous reactants, thereby forming a slurry, the apparatus comprising:
   a reactor vessel having a reactant inlet and configured to accommodate the slurry and a gas space above the slurry during normal operational use;
   a filtration system having a primary filter configured to be in fluid communication with the slurry during normal operational use, and wherein the primary filter has an outlet for primary filtrate that has been subjected to primary filtration by the primary filter;
   a gas demister configured to remove a source of entrained material from a gas source from the gas space above the slurry and produce a demister gas stream; and
   a secondary gas cleaner in fluid communication with the gas demister and configured to receive the demisted gas stream, whereby the secondary gas cleaner is capable of further removal of a source of relatively finer entrained material from the demisted gas stream,
   wherein a cross-sectional area of the demister is smaller than a cross-sectional area of the reactor above the slurry level, whereby a velocity of the gas source is increased as it passes through the demister during normal operational use.

2. The apparatus of claim 1, wherein the gas demister is located within the reactor vessel and configured to be located within the gas space.

3. The apparatus of claim 1, wherein the gas demister is a vane pack mist eliminator.

4. The apparatus of claim 3, wherein the vane pack mist eliminator has a series of corrugated plates arranged in a generally vertical configuration, whereby the gas source flows in a vertically upward direction through the vane pack mist eliminator.

5. The apparatus of claim 1, wherein the gas demister is configured to return the entrained material removed by the gas demister to the slurry.

6. The apparatus of claim 1, wherein the secondary gas cleaner is a cyclone.

7. The apparatus of claim 6, wherein the secondary gas cleaner has a first outlet for substantially particle-free gaseous product and a second outlet for particle-containing liquid product.

8. The apparatus of claim 1, wherein the primary filter is located within the reactor vessel.

9. The apparatus of claim 8, wherein the primary filter is located such that it is at least partially immersed in the slurry during normal operational use.

10. The apparatus of claim 1, further comprising a filtrate cleaning unit in fluid communication with the primary filter and configured to receive the primary filtrate from the primary filter.

11. The apparatus of claim 10, wherein the filtrate cleaning unit is a secondary filter unit, whereby the primary filter unit has a relatively coarse filter in comparison to the secondary filter unit having a relatively fine filter.

12. The apparatus of claim 10, wherein the filtrate cleaning unit is located outside the reactor vessel.

13. The apparatus of claim 10, wherein the filtrate cleaning unit has a product outlet for substantially particle-free liquid product and a slurry outlet for liquid product containing catalyst particles.

14. A process for conducting a three-phase reaction in which gaseous reactants are reacted in the presence of a finely divided solid catalyst in suspension in a liquid comprising, at least in part, the reaction product of the gaseous reactants thereby forming a slurry, the process comprising the steps of:
   introducing the gaseous reactants into the slurry in a reactor;
   subjecting the slurry to a primary filtration in a primary filter to produce a primary filtrate stream;
   subjecting gases located above the slurry to a demister wherein at least a first portion of an entrained material is removed from the gas to produce a demisted gas stream; and
   subjecting the demisted gas stream to a secondary gas cleaner wherein at least a second portion of the entrained material is removed from the demisted gas stream,
   wherein a velocity of the gas is increased as it passes from the reactor through the demister.

15. The process of claim 14, further comprising the step of returning the first portion of the entrained material removed by the gas demister to the slurry.

16. The process of claim 14, wherein the step of subjecting the demisted gas stream to the secondary gas cleaner produces a substantially particle-free gaseous product stream and a particle-containing liquid product stream.

17. The process of claim 14, further comprising the step of filtrate cleaning the primary filtrate stream with a filtrate cleaning unit to produce a substantially particle-free liquid product stream and a slurry stream of liquid product containing catalyst particles.

18. The process of claim 17, further comprising the step of removing fine catalyst particles from the filtrate cleaning unit that are filtered out in the filtrate cleaning step.

19. The process of claims 17, further comprising the step of conveying a particle-containing liquid product stream to the filtrate cleaning unit, wherein the particle-containing liquid product stream is produced by the step of subjecting the demisted gas stream to the secondary gas cleaner.

20. The process of claim 14, wherein the reaction is a Fischer-Tropsch synthesis reaction, wherein the reactor is a slurry bubble column reactor, wherein $H_2$ and CO are supplied to the slurry in the reactor, wherein the slurry comprises the catalyst in suspension in the liquid including the reaction products of the $H_2$ and CO, and wherein the catalyst is maintained in suspension in the slurry at least partly by the motion of the gas supplied to the slurry.

21. The process of claim 20, wherein the reaction temperature is in the range of 190-250° C. and the reaction pressure is in the range of 10-60 bar.

22. The process of claim 20, wherein an $H_2$/CO ratio of the gases supplied to the Fischer-Tropsch synthesis reactor is in the range of 1.1 to 2.2.

23. The process of claim 20, wherein a superficial gas velocity in the reactor is in the range of 5 to 60 cm/s.

24. The process of claim 20, further comprising a post-processing product of the Fischer-Tropsch synthesis reaction.

25. The process of claim 24, wherein the post-processing is chosen from de-waxing, hydro-isomerisation, hydro-cracking and combinations thereof.

26. A process for conducting a three-phase reaction in which gaseous reactants are reacted in the presence of a finely divided solid catalyst in suspension in a liquid comprising, at least in part, the reaction product of the gaseous reactants thereby forming a slurry, the process comprising the steps of:

introducing the gaseous reactants into the slurry in a reactor having a first cross-sectional area;

subjecting the slurry to a primary filtration in a primary filter to produce a primary filtrate stream;

subjecting gases located above the slurry to a demister having a second cross-sectional area, wherein at least a first portion of an entrained material is removed from the gas to produce a demisted gas stream; and subjecting the demisted gas stream to a secondary gas cleaner wherein at least a second portion of the entrained material is removed from the demisted gas stream, wherein the second cross-sectional area of the demister is smaller than the first cross-sectional area of the reactor above the slurry level, and whereby a velocity of the gas source is increased as it passes through the demister.

* * * * *